United States Patent
Noling et al.

(10) Patent No.: US 8,002,974 B2
(45) Date of Patent: Aug. 23, 2011

(54) PASSIVE STORMWATER MANAGEMENT SYSTEM

(75) Inventors: Calvin Noling, Portland, OR (US);
Daniel Scarpine, Portland, OR (US)

(73) Assignee: StormwateRx, LLC, Portland, OR (US)

( * ) Notice: Subject to any disclaimer, the term of this patent is extended or adjusted under 35 U.S.C. 154(b) by 867 days.

(21) Appl. No.: 11/975,636

(22) Filed: Oct. 18, 2007

(65) Prior Publication Data
US 2009/0101555 A1    Apr. 23, 2009

(51) Int. Cl.
*B01D 24/24* (2006.01)
*B01D 24/48* (2006.01)

(52) U.S. Cl. ........ 210/116; 210/202; 210/248; 210/266; 210/290; 210/291

(58) Field of Classification Search .................. 210/116, 210/170.3, 164, 202, 248, 263, 265, 266, 210/283, 290, 291, 317, 207, 259, 260, 261, 210/262
See application file for complete search history.

(56) References Cited

U.S. PATENT DOCUMENTS

| | | | | |
|---|---|---|---|---|
| 248,574 | A * | 10/1881 | Burkhardt | 210/116 |
| 962,606 | A * | 6/1910 | Wiest | 210/258 |
| 3,554,377 | A * | 1/1971 | Miller | 210/275 |
| 4,750,999 | A * | 6/1988 | Roberts et al. | 210/266 |
| 5,958,239 | A | 9/1999 | Sing | |
| 6,123,858 | A | 9/2000 | Manz | |
| 6,908,549 | B2 * | 6/2005 | Middleton et al. | 210/164 |
| 7,025,887 | B1 * | 4/2006 | Kirts et al. | 210/681 |
| 2002/0096466 | A1 * | 7/2002 | Perry, Jr. | 210/290 |

OTHER PUBLICATIONS

Examiner's Report dated Feb. 8, 2011 issued in Canada Patent Appn No. 2640600 (4 pgs).

* cited by examiner

*Primary Examiner* — Matthew O Savage
(74) *Attorney, Agent, or Firm* — Ater Wynne LLP

(57) ABSTRACT

A stormwater inlet near an upper edge of a layered filter media vessel is equipped with a distribution header that ensures effective use of the surface area of the filter media by providing plural spaced streams of stormwater thereat, each at a point of impact having its energy dissipated by a layer of material that covers the upper layered filter media surface. The stormwater inflow is metered to control the stormwater pollutant removal process kinetics, thereby slowing the mean free path of the stormwater therethrough and optimizing pollutant capture. The water level within the vessel is height adjustable manually by a pivot arm in the form of a standing column of water coupled to the water within the container. Weep conduits are provided to slowly drain down the standing water in the system between storm events, simplifying maintenance and promoting best removal of pollutants from first-flush storm events. Stormwater pretreatment, e.g. by use of an oleophilic agent or a pH-buffering agent, is provided. Filter media are easily cleaned, as by scraping and/or adding filter media material when existing material's particulate capture capacity is exhausted.

13 Claims, 5 Drawing Sheets

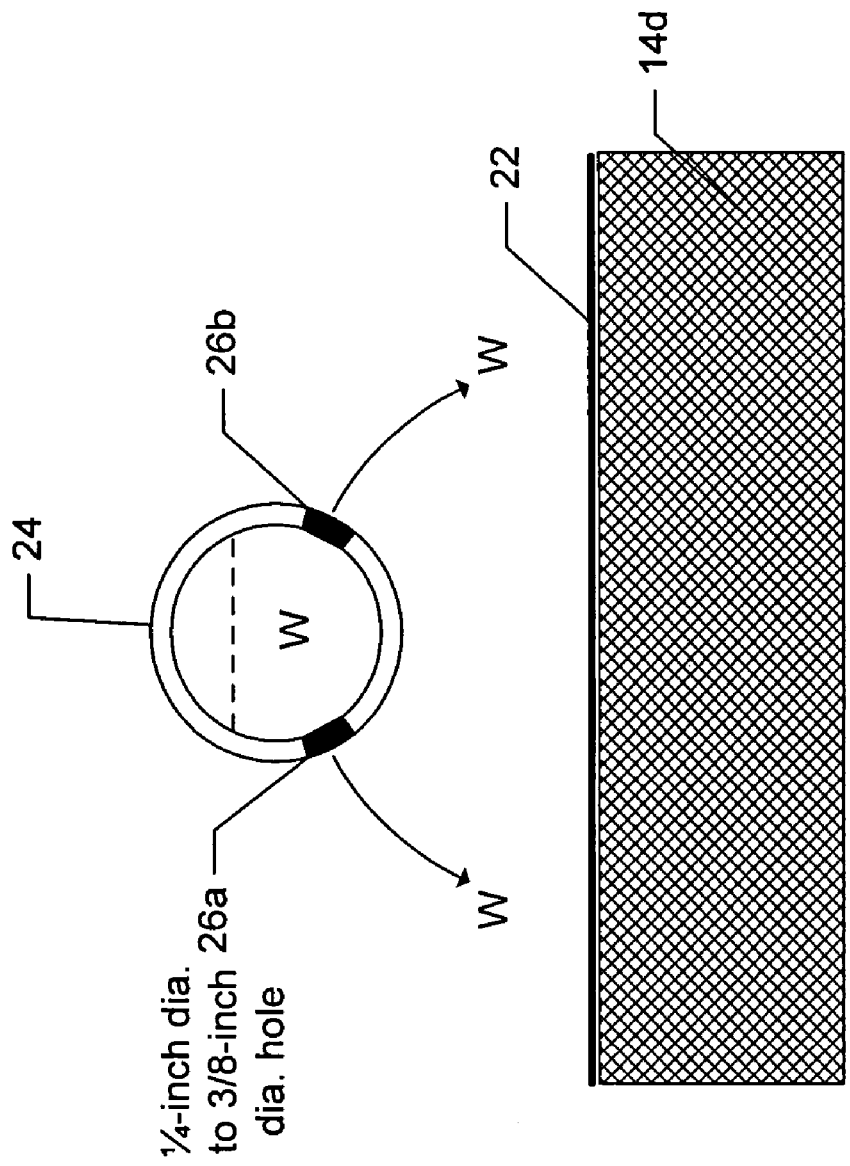

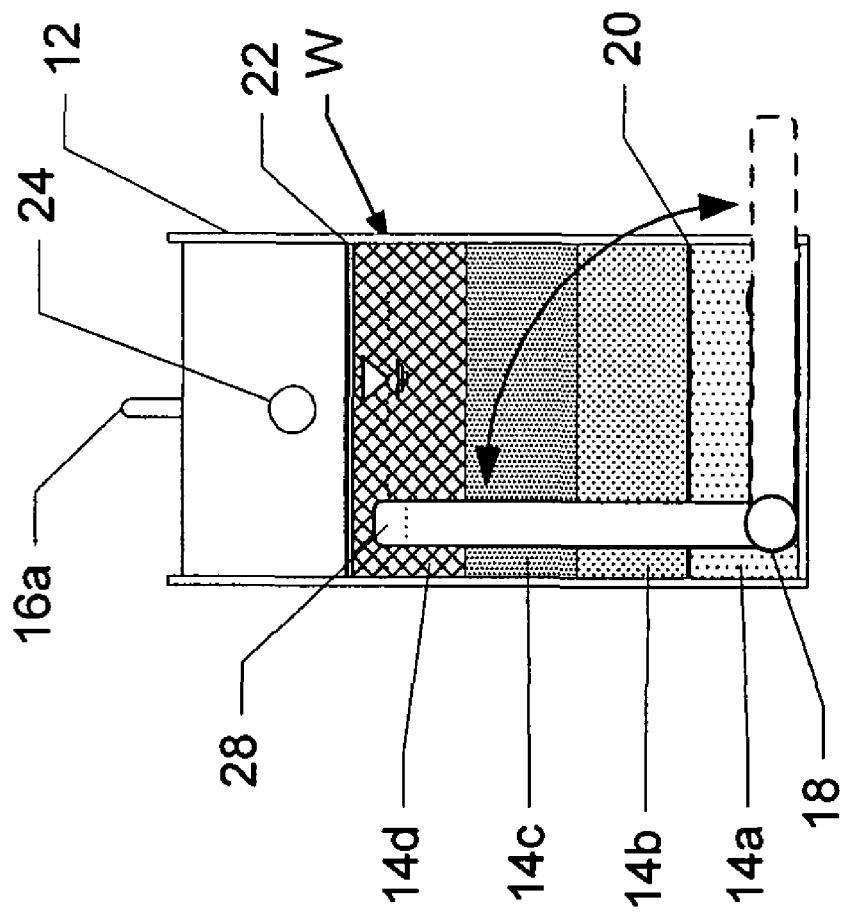

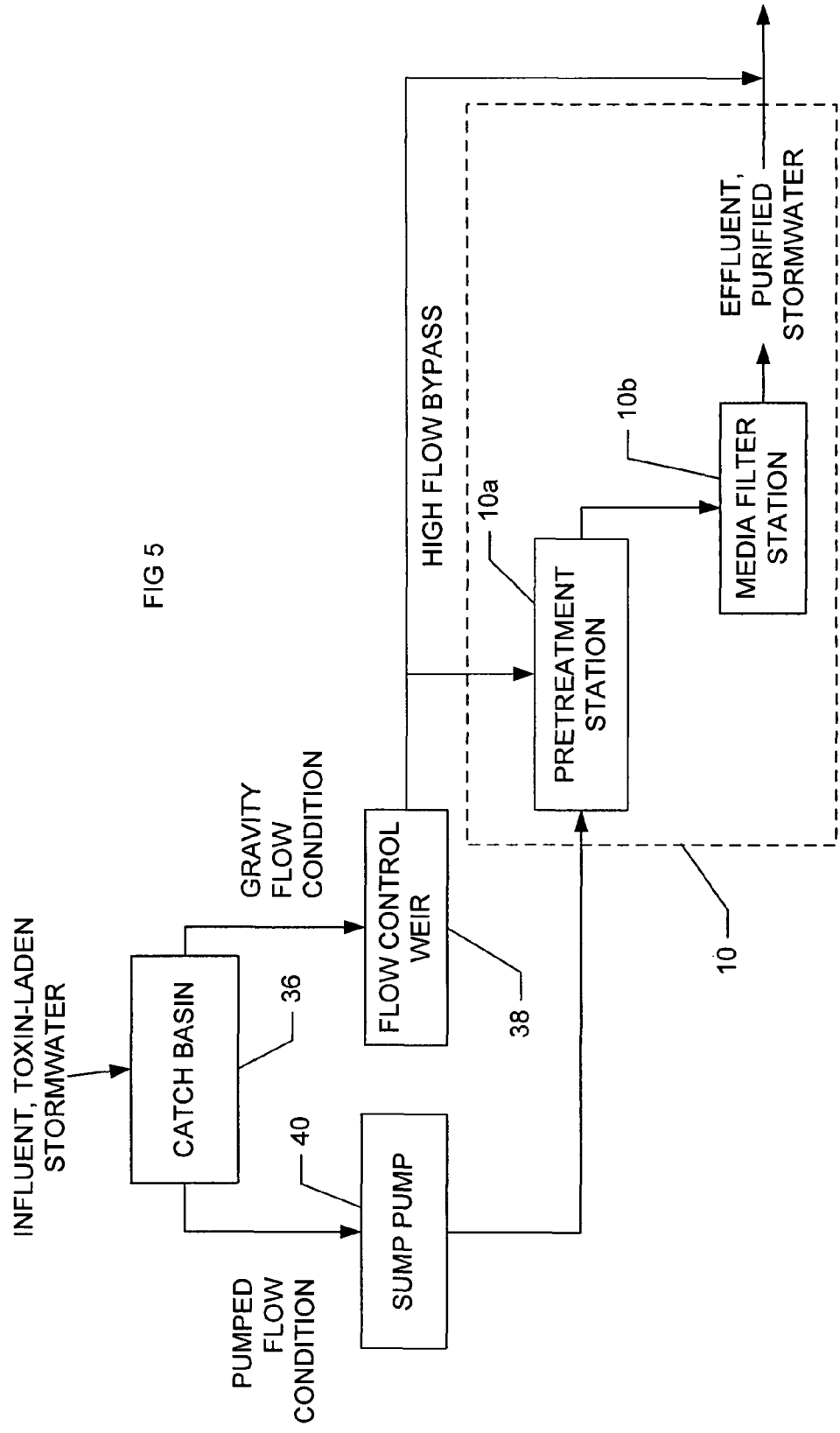

PASSIVE STORMWATER MANAGEMENT SYSTEM

FIELD OF THE INVENTION

This invention relates generally to the field of stormwater management. More particularly, it concerns treating stormwater inflow or influent to produce a purified stormwater outflow or effluent.

BACKGROUND OF THE INVENTION

Conventional stormwater filter systems for influent pollutant control and removal are subject to numerous heretofore unsolved problems. These problems include ineffective use of filter surface area due to a single inlet pipe, pitting of the filter media underneath such a single inlet pipe, uncontrolled water fall speeds through the filter media that promotes short-circuiting and increased particle shear forces causing loss of accumulated particulates into the effluent, uncontrolled water fall through sorptive filter media (insufficient "contact time") that reduces removal of dissolved pollutants, automatic water level controls that stick or otherwise fail, uncontrolled acidic pH levels in the influent that render toxic heavy metals more soluble and thus more difficult and expensive to capture in a filter, etc.

BRIEF DESCRIPTION OF THE DRAWINGS

FIG. 3 is an enlarged, fragmentary right-side elevation of the influent distribution header shown in FIGS. 1 and 2 taken along the lines 3-3 in FIG. 2.

FIG. 4 is a right-side elevation corresponding with FIGS. 1 and 2.

FIG. 5 is a system block diagram of the invented stormwater management apparatus and system as it may form a part of a larger stormwater management system.

DETAILED DESCRIPTION OF THE PREFERRED EMBODIMENTS

The invention in accordance with a preferred embodiment involves stormwater management system and apparatus for removing high levels of heavy metal toxins, particulates, or other pollutants from stormwater influent to produce relatively clean effluent having low levels of heavy metal toxins, particulates, and other pollutants. In accordance with one embodiment of invention, a stormwater inlet near an upper edge of a layered filter media container is equipped with a distribution header that ensures effective use of the considerable surface area of the filter media by providing plural spaced streams of stormwater thereat, each at a point of impact having its energy dissipated by a layer of material that covers the upper layered filter media surface. The stormwater inflow is metered to substantially saturate the layered filter media, thereby slowing the mean free path of the stormwater therethrough and increasing efficient particulate, heavy metal toxin and other pollutant capture.

In brief, the invention provides a self-contained structure that integrates pretreatment and filtration with passive hydraulic controls to optimize stormwater pollutant removal performance.

The media saturation level within the container is height adjustable manually by a pivot arm in the form of a standing column of water coupled to the water within the container. Stormwater pretreatment, e.g. by use of an oleophilic agent or a pH-buffering media, is provided. Filter media are easily cleaned, as by scraping and/or adding filter media material when existing material's surface structure becomes occluded and particulate capture capacity is exhausted. The relatively simple to install and maintain stormwater management apparatus is cost effective and extremely effective in removing pollutants from the treated effluent, thereby protecting the environment.

StormwateRx™ is a trademark owned exclusively by StormwateRx LLC, assignee of world-wide patent rights in the present invention. Worldwide rights in the trademark also are reserved.

Figure 1:
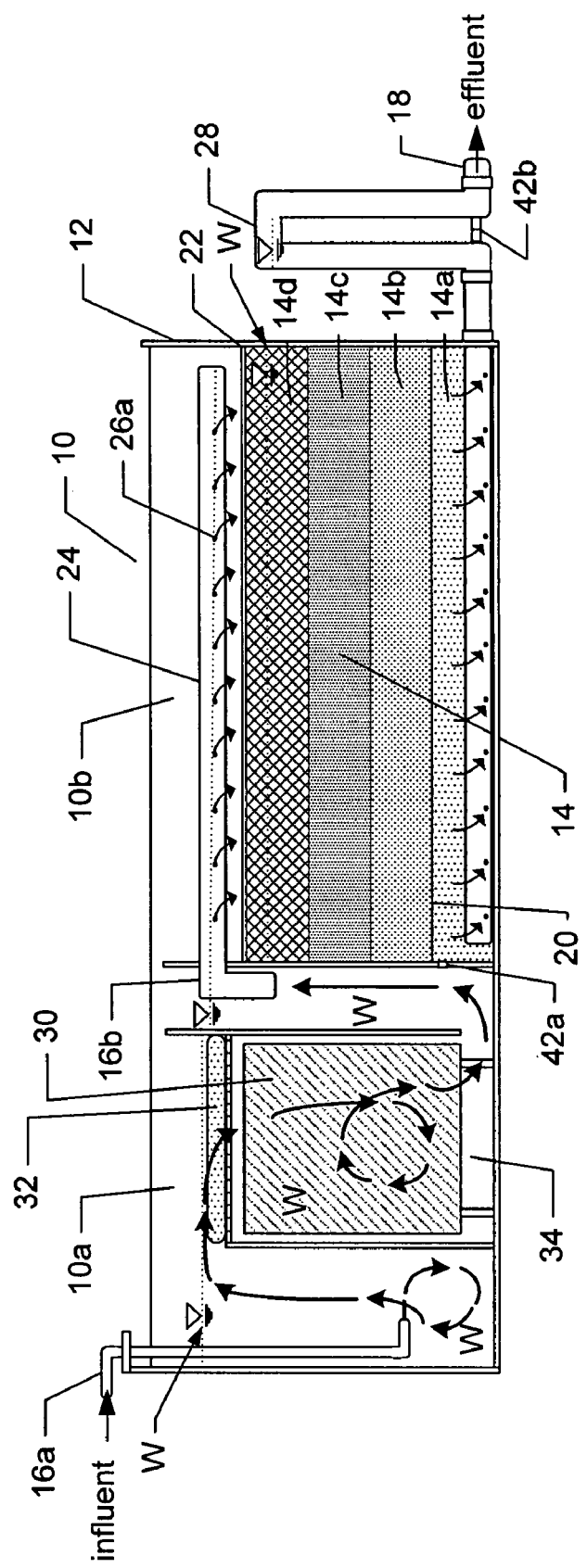
FIG. 1 is a front elevation of the stormwater management apparatus and system in accordance with one embodiment of the invention.
Figure 2:
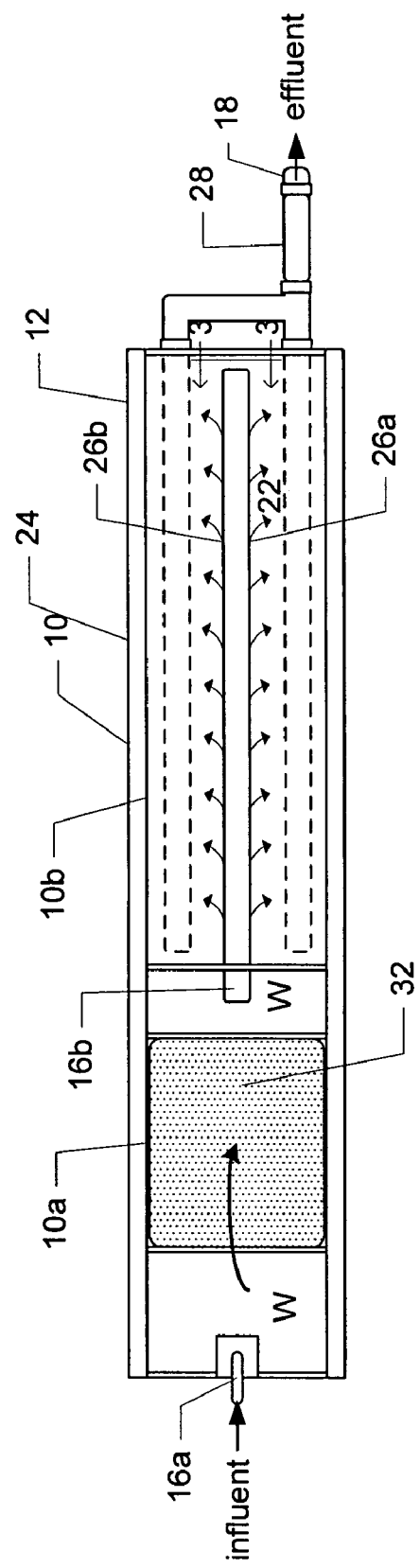
FIG. 2 is a top plan view corresponding with FIG. 1.

FIGS. 1 and 2 collectively show stormwater management apparatus or system 10 in accordance with one embodiment of the invention. In accordance with one embodiment of the invention, apparatus 10 includes a pretreatment mechanism 10a and a filter mechanism 10b, although those of skill in the art will appreciate that pretreatment mechanism 10a may not be required in certain applications. In the illustrated example, pretreatment mechanism 10a and filter mechanism 10b are housed in any suitable structure of any suitable shape and size. Apparatus 10 includes a sealed container or vessel 12 having four sidewalls and a base, the vessel configured to contain a defined volume of layered filter media 14 entrained with a defined volume of water W introduced into the vessel. Apparatus 10 will be understood to be a flow-through apparatus, in that the influent at the inlet is gravity fed to the outlet as effluent, whether in batch or continuous mode of filter operation. Those of skill in the art will appreciate that vessel 12 can be made of steel, concrete, aluminum, fiberglass, high density polyethylene (HDPE), or any other suitably durable material.

In accordance with one embodiment of the invention, vessel 12 is right rectangular relative to all three orthogonal axes, as can be seen from FIGS. 1 and 2. Those of skill will appreciate that the generally horizontal aspect ratio of the rectangles affects the hydraulics and thus the gravity-fed flow of stormwater through the layered filter media arranged within the vessel. In accordance with one early embodiment of the invention, vessel 12 is approximately 9 feet in length, 2.5 feet in width, and 4 feet in height, for approximately a 7 gallon per minute (gpm) flow rate or throughput. In accordance with another large-scale roll-off box embodiment, vessel 12 is approximately 16 feet in length, 8 in width, and 6 feet in height, for an approximately 100 gpm flow rate. In yet another stacked tote embodiment, vessel 12 is approximately 4 feet in length and width, and 8.5 feet in height, for an approximately 10 gpm flow rate.

Those of skill in the art will appreciate that suitable alternative lengths, widths, heights, proportions or aspect ratios, and flow rates or throughputs are contemplated, and that all are within the spirit and scope of the invention.

Apparatus 10 further includes influent (e.g. stormwater) inlet 16a in an upper edge region of vessel 12. Apparatus 10 further includes an effluent (e.g. purified stormwater) outlet 18 in a lower edge region near the base of vessel 12. Thus, those of skill in the art may appreciate that apparatus 10 relies on gravity movement of water from inlet to outlet via the layered filter media. Such a gravity-reliant system or apparatus as apparatus or system 10 thus is referred to herein as involving "passive" water management.

Layered filter media 14 in accordance with one embodiment of the invention includes a lower layer 14a of coarse media such as gravel, an overlying first intermediate layer 14b of granular activated carbon (GAC), an overlying second intermediate layer 14c of activated alumina, and an overlying top layer 14d of medium sand. The intermediate and upper layers can be in an approximately equal volumetric ratio, as can the lower layer, although those of skill in the art will appreciate that the intermediate layers can be omitted altogether and the others placed in any suitable form or ratio. Thus, those of skill in the art will appreciate that these illustrative media layers described above can be more, fewer, of different material, of different configuration, of different proportion, in different order bottom to top, etc. Any suitable layered filter media 14 makeup is contemplated as being within the spirit and scope of the invention.

Immediately above lower layer 14a in accordance with one embodiment of the invention is a layer 20 of fabric of defined weight and extent for preventing migration of media therebetween. Geotextile fabric or any suitable alternative can be used that is substantially impervious to the filter media but easily penetrated by water. Another layer 22 of fabric overlies upper layer 14d, which topmost layer also can be geotextile or any suitable alternative. Topmost layer 22 of fabric also can be of any suitable weight or extent, and may, in accordance with one embodiment of the invention, be coextensive with (of generally equal surface area to, congruent with) the upper filter media surface otherwise exposed, thereby substantially to cover the otherwise exposed filter media surface. Those of skill in the art will appreciate that topmost layer 22 protects the layered filter media from the elements, e.g. weather, falling debris, leaves or twigs, etc.

Topmost layer 22 acts in accordance with the invention to other beneficial effect: it disperses impact energy from the stormwater entering vessel 12 via inlet 24. Topmost layer 22 also cooperates in accordance with one embodiment of the invention with a dispersing structure, or distribution header, 24 extending above the layered filter media and topmost layer 22. Distribution header 24 can be seen from FIG. 1 to be in fluid communication with inlet 16b. While only one distribution header 24 is visible in FIG. 1, it can be seen from FIG. 2 that more than one header can be provided to further distribute stormwater over and across the surface of topmost layer 22. Those of skill in the art will appreciate that distribution header 24 can take any suitable form, but that, in accordance with one embodiment of the invention, it is a capped length of perforated pipe, e.g. of PVC.

FIG. 3 illustrates distribution header 24 in fragmentary and enlarged right-side elevation. Header 24 is generally cylindrical, typically of PVC and schedule 40, so the outside diameter (OD) depends on the inside diameter (ID). ID is chosen based on flow, assuming the pipe is about ⅔ full at design operation rate. Thus for a small filter embodiment, the ID might be approximately 1.5 inches or smaller. For larger filter embodiments, the ID may be approximately 4-6 inches or larger.

It can be seen from FIGS. 2 and 3 that, in accordance with one embodiment of the invention, distribution header 24 includes numerous hole pairs such as hole pair 26a, 26b approximately evenly spaced (e.g. at approximately four to six inch intervals) along its length, the holes in each pair being spaced apart by approximately sixty degrees. The holes are approximately 0.25-0.375 inches in diameter. As may be appreciated from FIG. 2, the holes or perforations distribute the head of stormwater within header 24 into ten (more or less) discrete smaller and spaced apart streams of water (rivulets) that are relatively more evenly spread across the surface of layered filter media 14. As these discrete streams of water strike the upper surface of topmost layer 22, their impact energy is dissipated by the layer 22 and thus the impact and pitting on the layered filter media is lessened. This improves the efficiency of stormwater purification and produces a novel improvement in the tradeoff between throughput and purity of effluent.

Referring briefly back to FIGS. 1 and 2, it may be seen that the so-called "media saturation" level of water within vessel 12 is easily and manually adjustable for optimum tradeoff between effluent throughput and purity. Pivotable lever 28 as a part of outlet 18 includes therein a standing-column of water in fluid communication with the water within vessel 12. Thus, by manually pivoting lever 28, the communicative "media saturation" water level within vessel 12 quickly and manually can be raised or lowered to optimize performance of apparatus 10. This avoids more complex and failure-prone floats and valves or other metering and level control devices.

FIG. 4 in right-side elevation features pivotable lever 28 and its simple, manual operability to adjust the media saturation level of water within vessel 12 of invented apparatus 10. Manually pivotable lever 28 can be pivoted to set the media saturation water level within the vessel anywhere between the highest and lowest levels by pivoting it between the vertical (solid lines) and the horizontal (dashed lines). Lever 28 will be understood to be pivotally connected to vessel 12 along a lower edge thereof via a suitable coupling 18a, e.g. a union. Those of skill will appreciate that the water within the vessel will seek the same level, e.g. "track", the water column level within upside-down U-shaped lever arm 28. Thus the media saturation level is failsafe and can be quickly and manually adjusted without resort to leaky siphons, or difficult to control flow control valves used conventionally.

(Those of skill in the art will appreciate that pivotable lever 28 can be provided in any suitable configuration alternative to the upside-down U-shaped arm shown best perhaps in FIG. 1. For example, within the spirit and scope of the invention, it can alternatively take the form of a single upright, pivotable conduit that is bifurcated throughout most of its length in order to provide an elevation-adjustable through-channel between an upstream half and a downstream half. Such might take the form of a solid interior baffle that seals the bifurcated parallel conduits throughout most of the length but leaves an opening at the nominal top of the lever for fluid communication between the bifurcated halves. In such an embodiment, "weep conduit" 42b might be referred to as a "weep hole" formed within a lower region of the baffle, similar to "weep hole" 42a. Any and all suitable alternative embodiments are contemplated as being within the spirit and scope of the invention.)

Pretreatment mechanism 10a can be understood in accordance with one embodiment of the invention to include an oleophilic agent 30 in any suitable form that separates oil from the influent. It may be seen from FIG. 1 that pretreatment mechanism 10a preferably takes the form whereby influent passes horizontally through the pretreatment agent and structure, then flows and passes upwardly and out of chamber 34 through inlet 16b and header 24 into vessel 12 of management mechanism 10b.

In accordance with another embodiment of the invention, pretreatment mechanism 10a includes a granular pH-buffering medium 32, e.g. a geotextile bag filled with granular passive adsorptive media such as magnesium hydroxide or calcium carbonate or a suitable alternative. Said pH buffering agent breaks down naturally into alkalinity and hardness ions, both of which are present in abundance in natural water ecosystems. The pH buffering agent naturally increases the alkalinity and reduces the acidity of stormwater influent within stormwater management mechanism 10a to reduce the solubility of heavy metals therein. Typically, stormwater might have a pH of approximately 5, which relatively low pH tends to maintain certain pollutants such as heavy metals dissolved in solution, e.g. ionized. Said stormwater management mechanism 10a naturally raises the pH to approximately 8 or 9 and thereby induces precipitation of metals via metal hydroxide or metal carbonate formation, effectively releasing such solubilzed heavy metals from solution so that they can be more effectively captured within layered filter media 14.

Those of skill in the art and knowledgeable about the survivability of aquatic organisms including fish will appreciate other advantages of using these pH buffering media, e.g. magnesium hydroxide and calcium carbonate. Such pH buffering media when in an aqueous environment are known to "release hardness" (i.e. magnesium or calcium) into the water flowing out of mechanism 10a and into mechanism 10b. The United States Environmental Protection Agency has determined that hardness renders certain remaining ionized heavy metals in water less toxic to aquatic organisms. Thus, the invented stormwater management system not only removes heavy metals (e.g. zinc, copper, lead, etc.) that are known toxins—even at low concentrations—to aquatic organisms, but it also increases the influent water's hardness such that any dissolved toxic metals remaining in the effluent water are less toxic to aquatic organisms.

Those of skill in the art will appreciate that increased contact time between the pretreatment media and the influent, e.g. stormwater, is beneficial in improving the pretreatment effect, whether pretreatment involves oil removal or pH buffering. Thus, flow control through apparatus 10 is varied in accordance with the invention in order to properly and beneficially control contact time of the stormwater within pretreatment station 10a and/or media filter station 10b. Such is passively controlled in keeping with the passive nature of the invented apparatus and system by dimensioning the inlet, outlet and other fluid conduits to accommodate desired flow rate and efficiency levels.

Referring back to FIG. 1, it may be seen that a "weep conduit" or "weep hole" 42a in the wall that subdivides vessel 12 allows free standing water in the pretreatment station 10a to drain down slowly in the event that stormwater influent through inlet 16a is terminated. Those of skill in the art will appreciate that this feature reduces the possibility that particulates settled in the bottom of pretreatment station 10a will dissolve into the free standing water. Those skilled in the art and knowledgeable about maintenance of stormwater systems will appreciate that this feature reduces the volume of free standing water that must be managed in the case that the stormwater management apparatus 10 requires maintenance or cleaning.

Referring back to FIG. 1, it may be seen that a "weep conduit" 42b allows free standing water in the media filter station 10b to drain down slowly in the event that stormwater influent through inlet 16b is terminated. Those skilled in the art and knowledgeable about stormwater management systems will appreciate that this feature allows hydraulic capacity (water volume) within the media filter station to be made available for subsequent stormwater runoff events. Those skilled in the art will appreciate that this feature promotes more contact time between "first flush" storm water and filtration media increasing the removal efficiency of pollutants present in the first flush runoff.

It is noted that inclusion of an intermediate chamber 34 at the lower right side of pretreatment apparatus 10a and upstream from inlet 16b of stormwater management apparatus 10b is desirable to the pH buffering reaction as well as to precipitate and complex formation. This is because, in soft water (e.g. rainwater), the alkalinity is extremely low and buffering capacity is weak. This means that when alkalinity is added by the adsorptive buffering media, the pH fluctuates at any given point in chamber 34 until the water is fully mixed. The "soak" time provided by chamber 34 also promotes thorough formation of precipitates as they move through the three precipitation steps: nucleation, crystal growth, and agglomeration of the solids. Provision of chamber 34 beneath the pH buffer media ensures that, by the time the water hits the layered filter media, the pH of the water is stable and the complexes/precipitates already are formed.

Those of skill in the art also will appreciate that the higher level of water within vessel 12 referred to herein as a "media saturation" level beneficially slows the gravity-fed mean free fall path of stormwater through layered filter media 14. This so-called "plug flow" through invented apparatus 10 represents an improvement over conventional filtration in which particulate-laden water cascades downward following the path of least resistance through the filter media's interstices or voids. The plug flow regime offers a more consistent and tortuous flow path and promotes more efficient and effective particulate capture therein.

Stormwater Management Example:

StormwateRx™ system performance data from various field tests analyzed by third parties are tabulated in Table I below.

TABLE I

Performance ranges and end-point pollutant concentration data observed from a number of third party-analyzed tests of StormwateRx ™ systems are summarized below StormwateRx ™ Summary of All 3$^{rd}$ Party Analyzed Data$^{†}$, Sep. 25, 2007

| Stormwater Pollutant | Average Influent (mg/L) | Average Effluent (mg/L) | Average Removal Efficiency | Range Removal Efficiency | # Data Points |
|---|---|---|---|---|---|
| Suspended Solids | 150 | 5.0 | 97% | 89-100% | 11 |
| Turbidity | 30 | 3.8 | 87% | 35-90% | 5 |
| Zinc, total | 19 | 0.26 | 99% | 91-100% | 16 |
| Zinc, dissolved | 10 | 0.16 | 98% | 60-100% | 14 |
| Copper, total | 0.024 | <0.001 | >96% | 96-100% | 2 |
| Copper, dissolved | 0.069 | <0.05 | >27% | >27% | 1 |
| Lead, total | 0.047 | 0.013 | 73% | 65-100% | 2 |
| Iron, total | 3.7 | 0.053 | 99% | 98-100% | 3 |
| Aluminum, total | 1.8 | 0.063 | 96% | 95-100% | 3 |
| pH (std units) | 7.4 | 8.1 | — | — | 13 |
| Nitrate | 0.85 | 0.30 | 65% | 40-90% | 2 |
| BOD$_5$$^{‡}$ | 10 | 1.0 | 90% | 90% | 1 |

$^{†}$Data presented to 2-significant digits. Parameters that were not detected assumed present at 0% of the detection limit.
$^{‡}$5-day Biological Oxygen Demand (the amount of oxygen required by bacteria while stabilizing decomposable organic matter under aerobic conditions over a 5-day period of time)

Highlighted by the tabulated data above are removal of 89-100% of the suspended solids from the effluent, removal of 91-100% of the zinc from the effluent, removal of 60-100% of the dissolved zinc from the effluent, and removal of 96-100% of the copper from the effluent. These are remarkable results, and illustrate the purity of the effluent produced by the invented passive stormwater treatment and management apparatus and system.

The invented StormwateRx™ system configuration and operation is well suited for stormwater applications at industrial facilities, construction sites and in some municipal applications, although the system also has applicability for groundwater treatment and wastewater treatment. Some of the features of the invention that are beneficial in this type of application include:

Small Footprint, Portable Equipment. The invented system is available in a range of sizes including a skid-mounted configuration that can be easily moved with a forklift. Smaller systems similar to the embodiment described by reference to FIGS. 1-3 above may be more suitable and adaptable for smaller sites where installation of a lengthy and complex stormwater conveyance is not technically or financially feasible. Compact size affords the opportunity to install systems at several locations around a site, working with existing stormwater collection and conveyance system.

Above-Ground Installation Option. Typical full scale installation is in a pump-and-treat configuration to avoid challenges associated with flooding of stormwater conveyance pipes due to lack of natural driving head or fall. A typical portable above-ground installation would include retrofitting catch basins with a flow control weir and a submersible pump.

Simple Operation. The invented system is passive, i.e. it requires no electrical power. The invented system uses gravity, natural water chemistry processes, and physics (e.g. precipitation, adsorption, micro-sedimentation, and filtration) to remove pollutants from stormwater and to protect the environment. By virtue of its passive design, the invented system is simple to operate and can be maintained by typical maintenance personnel. Filtration capacity may be restored simply by raking the surface of the filter media; additional capacity can be achieved by adding inert media to the surface of the filter. Adsorptive pollutant removal capacity can be restored by a simple media replacement performed by the owner.

Reasonable Price. The StormwateRx™ system is designed to be affordable, meeting the cost and personnel constraints common to most operations.

System Integration

As mentioned previously, some installations include retrofitting an existing catch basin with a weir to build up a small pool of water and installing a submersible sump pump to convey water to the invented management system 10. Discharge from the invented apparatus is by gravity and can be directed to the same catch basin, downstream (in terms of process flow direction but not necessarily in terms of elevation) from the collection point. A simple form of this larger system integration is illustrated in FIG. 5.

FIG. 5 illustrates a larger system context for the invented management apparatus and system 10 in stormwater management. Those of skill in the art will appreciate that the flow of water (from upstream to downstream, again in terms of process flow direction but not necessarily in terms of elevation) generally is from upper left to lower right through the illustrated diagram, as indicated by arrows. Influent, e.g. toxin-laden stormwater, can be collected in a catch basin 36 or other suitable structure used as a hydraulic collection point to ensure proper flow and treatment capacity. Under a gravity flow condition, the collected influent can be flow controlled, as by use of a flow control weir or orifice discharge 38 or other suitable structure. Under a pumped flow condition, a (submerged) pump 40 can be used to supply a metered feed of influent from the catch basin to the inlet of stormwater management system 10. System 10 includes an optional pretreatment station 10a and a media filter station 10b, one or both preferably being made in accordance with the present invention to produce an effluent, e.g. purified stormwater, that is substantially cleaned of toxins, contaminants, pollutants, and other hazardous or environmentally undesirable particulates and elements.

Those of skill in the art will appreciate that, inherent to stormwater systems design, it is important to include a high-flow bypass. Such a bypass is illustrated in FIG. 5. In keeping with this system design principle, an excess (e.g. catastrophic) overflow control pipe extending around the boundaries of invented system 10 for channeling excess water therearound instead of therethrough can be provided, consistent with the present invention and the teachings herein.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

From the foregoing, those of skill in the art will appreciate that several advantages of the present invention include the following.

The present invention provides unprecedented pollutant removal performance in the field of stormwater management. Particulate-laden portions of its layered filter media can easily be scraped off and replaced with fresh filter media in the field without moving the invented apparatus. Saturated filter media increases the efficiency with which particulate and dissolved pollutants are removed from the influent or stormwater, and the extent of media saturation can be easily adjusted to accommodate the tradeoff between effluent or stormwater throughput and purity. A stream of influent is distributed by one or more distribution headers relatively evenly over the upper surface of the layered filter media, thereby fully utilizing the media and further improving efficiency. The impact of each rivulet of influent produced by the one or more distribution headers is further reduced by providing an impact-dissipation fabric layer over the upper layer of filter media material, leaving the filter media undisturbed. A pretreatment mechanism optionally is provided for removal of oil from influent, and a second pretreatment mechanism is provided for buffering the influent's pH level for more efficient filtration. The pH buffering agent "releases hardness" in the influent to the invented stormwater management system, reducing the toxicity of any residual ionized heavy metals from the effluent. Two "weep conduits" in the stormwater reclamation system promote drain down of accumulated stormwater when influent flow has ceased, simplifying maintenance and optimizing pollutant removal during "first flush" stormwater runoff events that contain heavier than normal stormwater pollutant loadings. The effluent from the invented apparatus or system is relatively free of metal, toxin, contaminant, pollutant, and other particulate, thereby protecting the environment.

Those of skill in the art will appreciate that the present invention directly contributes to environmental protection by removing particulates, toxic heavy metals, contaminants, oil, and/or other pollutants, from stormwater, runoff, discharge or other influent of water laden therewith and producing an effluent having greatly reduced pollutant content.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A stormwater management system comprising:

a vessel having a bottom and circumferential sealed sidewalls joined thereto;

a filter chamber containing layered particulate filter media disposed within the vessel and positioned adjacent an end one of said sidewalls and said bottom, the filter media including a lower coarser filter media layer and an upper finer filter media layer thereabove;

a filter chamber inlet operatively coupled with an upper region of the filter chamber above the upper filter media layer, the filter chamber inlet and the filter chamber being configured when stormwater is present to till the filter chamber with water up to a maximum water level above the bottom of the vessel;

a purified stormwater outlet operatively coupled with a lower extent of the vessel, the outlet including a first conduit portion extending generally horizontally from a lower exterior surface of said one sidewall, a second conduit portion extending upwardly from an outlet end of the first conduit portion, a third conduit portion extending generally horizontally from an outlet end of the second conduit portion, a fourth conduit portion extending downwardly from an outlet end of the third conduit, and a fifth conduit portion extending generally horizontally from an outlet end of the fourth conduit portion, wherein the outlet end of the first conduit portion and an inlet end of the fifth conduit portion are generally concentric, wherein the third conduit portion is generally disposed above the first conduit portion and the fifth conduit portion, wherein a height of the third conduit portion relative to the bottom of the vessel determines a height of the water level within the filtration chamber, and wherein the second, third and fourth conduit portions are rotatable as a unit about an axis concentric with the outlet end of the first conduit portion and with the inlet end of the fifth conduit portion, and whereby the height of the third conduit portion relative to the bottom of the vessel is adjustable and maintains the level of water in the filtration chamber at or below said maximum water level; and a dispersing structure operatively coupled with the filter chamber inlet to substantially evenly disperse water from the inlet as water flows therefrom onto an upper surface of the upper media layer.

2. The system of claim 1, wherein the dispersing structure includes one or more perforated conduits extending from the filter chamber inlet over the upper surface of the upper media layer.

3. The system of claim 2, wherein the dispersing structure includes plural ones of such perforated conduits spaced apart from one another over the upper surface of the upper media layer.

4. The system of claim 1 further comprising:

an impact barrier layer immediately above the upper surface of the upper filter media layer, the impact barrier layer configured to distribute the energy of impact from plural rivulet streams of stormwater dispersed by the dispersing structure.

5. The system of claim 1 further comprising:

a pretreatment chamber upstream from the filter chamber and operatively coupled therewith by the stormwater inlet; and a small-diameter weep conduit causing low-rate fluid communication through a dividing wall between the pretreatment, chamber and the layered filter media within the filter chamber.

6. The system of claim 5, wherein the pretreatment chamber includes an agent configured to buffer the pH of a volume of stormwater contained therein.

7. The system of claim 5, wherein the pretreatment chamber includes an oleophilic agent for drawing off oils from stormwater.

8. The system of claim 1, further comprising:

a small-diameter weep conduit allowing low-rate fluid communication between the layered filter media within the filter chamber and the purified stormwater outlet and bypassing the third conduit portion.

9. The system of claim 1, wherein the upper finer filter media layer includes sand, wherein the lower coarser filter media layer includes gravel, and wherein the layered filter media further includes one or more filter media layers intermediate the upper and lower filter media layers, the one or more intermediate filter media layers including one or more of activated alumina and granular activated carbon.

10. A stormwater management system comprising:

a vessel having a bottom and circumferential sealed sidewalls joined thereto;

a filtration chamber disposed within the vessel adjacent an end one of said sidewalls and said bottom;

layered particulate filter media within the filtration chamber, the filter media including a lower coarser filter media layer and an upper finer filter media layer thereabove;

a filter chamber inlet operatively coupled with an upper region of the filtration chamber above the upper filter media layer, the inlet and the container being configured when stormwater is present to fill the filtration chamber with water up to a maximum water level above the bottom of the vessel; and a purified stormwater outlet operatively coupled with a lower region of the vessel, the outlet including a first conduit portion extending generally horizontally from a lower exterior surface of said one sidewall, a second conduit portion extending upwardly from an outlet end of the first conduit portion, a third conduit portion extending generally horizontally from an outlet end of the second conduit portion, a fourth conduit portion extending downwardly from an outlet end of the third conduit, and a fifth conduit portion extending generally horizontally from an outlet end of the fourth conduit portion, wherein the outlet end of the first conduit portion and an inlet end oldie fifth conduit portion are generally concentric, wherein the third conduit portion is generally disposed above the first conduit portion and the fifth conduit portion, wherein a height of the third conduit portion relative to the bottom of the vessel determines a height of the water level within the filtration chamber, and wherein the second, third and fourth conduit portions are rotatable as a unit about an axis concentric with the outlet end of the first conduit portion and with the inlet end of the fifth conduit portion, and whereby the height of the third conduit portion relative to the bottom of the vessel is adjustable and maintains the level of water in the filtration chamber at or below said maximum water level.

11. The system of claim 10, further comprising:
a small-diameter weep conduit allowing low-rate fluid communication between the first conduit portion and the fifth conduit portion While bypassing the third conduit portion.

12. The system of claim 10 further comprising:
a dispersing structure operatively coupled with the filter chamber inlet to substantially evenly disperse stormwater from the filter chamber inlet as stormwater flows therefrom onto an upper surface of the upper filter media layer, wherein the dispersing structure includes one or more perforated conduits extending from the filter chamber inlet over the upper surface of the upper filter media layer.

13. The apparatus of claim 10 further comprising:
an energy dissipation layer above the upper filter media layer, the energy dissipation layer configured to dissipate impact energy from plural streams of stormwater distributed by as water distribution header.

* * * * *

UNITED STATES PATENT AND TRADEMARK OFFICE
CERTIFICATE OF CORRECTION

| | | |
|---|---|---|
| PATENT NO. | : 8,002,974 B2 | Page 1 of 1 |
| APPLICATION NO. | : 11/975636 | |
| DATED | : August 23, 2011 | |
| INVENTOR(S) | : Calvin Noling et al. | |

It is certified that error appears in the above-identified patent and that said Letters Patent is hereby corrected as shown below:

Column 9, line 16, "till" should be changed to --fill--.

Column 9, line 59, "harrier" should be changed to --barrier--.

Column 10, line 3, "pretreatment, chamber" should be changed to --pretreatment chamber--.

Column 10, line 54, "oldie" should be changed to --of the--.

Column 11, line 4, "While" should be changed to --while--.

Column 12, line 8, "as" should be changed to --a--.

Signed and Sealed this
Fourth Day of October, 2011

David J. Kappos
*Director of the United States Patent and Trademark Office*